US010909048B1

(12) United States Patent
Scarpantoni et al.

(10) Patent No.: US 10,909,048 B1
(45) Date of Patent: Feb. 2, 2021

(54) DECLARATIVE TRANSACTIONAL COMMUNICATIONS WITH A PERIPHERAL DEVICE VIA A LOW-POWER BUS

(71) Applicant: MICROSOFT TECHNOLOGY LICENSING, LLC, Redmond, WA (US)

(72) Inventors: Alessandro Domenico Scarpantoni, Redmond, WA (US); Mei Ling Wilson, Redmond, WA (US); Shyamal K. Varma, Issaquah, WA (US); Ajay P. Barboza, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/588,794

(22) Filed: Sep. 30, 2019

Related U.S. Application Data

(60) Provisional application No. 62/880,468, filed on Jul. 30, 2019.

(51) Int. Cl.
*G06F 13/10* (2006.01)
*G06F 13/42* (2006.01)

(52) U.S. Cl.
CPC ........ *G06F 13/102* (2013.01); *G06F 13/4282* (2013.01); *G06F 2213/0016* (2013.01)

(58) Field of Classification Search
CPC .............. G06F 13/102; G06F 13/4282; G06F 2213/0016
See application file for complete search history.

(56) References Cited

U.S. PATENT DOCUMENTS 5,659,781 A * 8/1997 Larson .................. H04L 12/433
712/11
7,069,206 B2 6/2006 Movall et al.
(Continued)

FOREIGN PATENT DOCUMENTS

WO 2017107123 A1 6/2017

OTHER PUBLICATIONS

"Hardware Abstraction Layer—Apache Mynewt latest documentation", Retrieved from: https://web.archive.org/web/20180802075641/https:/mynewt.apache.org/latest/os/modules/hal/hal.html, Aug. 2, 2018, 4 Pages.

(Continued)

*Primary Examiner* — Henry Tsai
*Assistant Examiner* — John B Roche
(74) *Attorney, Agent, or Firm* — Newport IP, LLC; Jacob P. Rohwer

(57) ABSTRACT

The disclosed techniques enable a software program to communicate with a peripheral device (e.g., a sensor), via a low-level communication protocol such as the I²C protocol, even though the software program does not include lower-level code configured to implement a sequence of operations defined for the low-level communication protocol. The techniques determine that the software program includes a high-level operation that instructs for communications to be conducted with the peripheral device. The high-level operation is associated with a separately stored configuration file that includes the lower-level code configured to implement the sequence of operations enabling the communications to be conducted with the peripheral device via the low-level communication protocol. The techniques then execute the lower-level code included in the configuration file and return information, to the software program, indicating that the (Continued)

communications with the peripheral device have been conducted via the low-level communication protocol.

18 Claims, 7 Drawing Sheets

(56) References Cited

U.S. PATENT DOCUMENTS

| | | | |
|---|---|---|---|
| 8,725,916 B2 | 5/2014 | Bhesania et al. | |
| 9,430,414 B2 | 8/2016 | Trethewey | |
| 9,569,375 B2* | 2/2017 | Kumar | G06F 13/102 |
| 2003/0014549 A1* | 1/2003 | Seidman | H04L 29/06 |
| | | | 719/310 |
| 2003/0163697 A1* | 8/2003 | Pabla | H04L 9/0891 |
| | | | 713/171 |
| 2007/0234316 A1* | 10/2007 | Bayerlein | G06F 9/44547 |
| | | | 717/140 |
| 2008/0091857 A1* | 4/2008 | McDaniel | H04L 63/123 |
| | | | 710/72 |
| 2012/0173767 A1 | 7/2012 | Kim et al. | |
| 2013/0326098 A1 | 12/2013 | Franzen et al. | |
| 2018/0234519 A1 | 8/2018 | Boyapalle et al. | |
| 2020/0059420 A1* | 2/2020 | Abraham | G06F 8/60 |

OTHER PUBLICATIONS

"I2C—Apache Mynewt latest documentation", Retrieved from: https://mynewt.apache.org/latest/os/modules/hal/hal_i2c/hal_i2c. html, Retrieved Date: Jun. 26, 2019, 11 Pages.

"Tutorial I2C Adapters", Retrieved from: https://www.dialog-semiconductor.com/sites/default/files/da1468x_i2c_adapter_tutorial_v2_1.pdf, Retrieved Date: Jun. 26, 2019, pp. 1-33.

"International Search Report and Written Opinion Issued in PCT Application No. PCT/US20/036884", dated Oct. 5, 2020, 11 pages.

* cited by examiner

CONFIGURATION FILE 300

```
{
  "OPERATION_NAME":"READ_PH",
  "PARAMETERS":["TEMPERATURE"],
  "RETURNS":["PH"],
  "OPERATIONS":[
    ["WRITE_REGISTER_U32", I2C_PH_ADDR, I2C_PH_REG_TEMP, "TEMPERATURE"],
    ["WRITE_REGISTER", I2C_PH_ADDR, I2C_PH_REG_STATUS, 0],
    ["POLL_REGISTER", I2C_PH_ADDR, I2C_PH_REG_STATUS, "1MS"],
    ["READ_REGISTER_U32", I2C_PH_ADDR, I2C_PH_REG_DATA, "PH"]
  ]
}
```

FIG. 3

DECLARATIVE TRANSACTIONAL COMMUNICATIONS WITH A PERIPHERAL DEVICE VIA A LOW-POWER BUS

PRIORITY APPLICATION(S)

This application claims the benefit of and priority to U.S. Provisional Application No. 62/880,468, filed Jul. 30, 2019, the entire contents of which are incorporated herein by reference.

BACKGROUND

As use of peripheral devices (e.g., low-power sensors) expands, more software programs are being written to communicate with these peripheral devices. These peripheral devices communicate with a controller (e.g., an Internet of Things (IoT) device) using a low-level communication protocol, such as the Inter-Integrated Circuit (i.e., $I^2C$ or I2C) protocol. A low-level communication protocol typically includes a sequence of defined operations that must be conducted in order to read data from or write data to the peripheral device. For example, reading a data value from a sensor often includes five or six defined operations that must be conducted via the low-level communication protocol in order to implement the read.

Consequently, software programs which interface with these peripheral devices using a low-level communication protocol are required to include device specific code that can be executed to implement the sequence of defined operations. Further to the example mentioned above, this means that a developer of one of these software programs is required to know how to code the sequence of defined operations in order to perform the basic operation of reading the data value from the sensor using the low-level communication protocol, such as the $I^2C$ protocol. This unnecessarily consumes time and resources as the developer must familiarize herself or himself with the low-level communication protocol used by the controller to communicate with the peripheral device.

It is with respect to these and other considerations that the disclosure made herein is presented.

SUMMARY

The techniques described herein enables a software program to communicate with a peripheral device, via a low-level communication protocol implemented over a low-power bus, even though the software program does not include device specific code configured to implement a sequence of operations defined for the low-level communication protocol. To do this, the system described herein enables a developer of the software program (e.g., a "consuming" application) to declaratively reference a sequence of low-level operations to be implemented via the low-level communication protocol over the low-power bus. The sequence of low-level operations may be implemented to exchange data with a peripheral device and/or to apply a specific configuration to the peripheral device. In various examples, the low-level communication protocol includes the Inter-Integrated Circuit (i.e., $I^2C$ or I2C) protocol, the Human Interface Device (i.e., HID) protocol, or the WINDOWS Management Interface (i.e., WMI) protocol.

As described herein, a configuration file is used to associate a high-level operation declared in the software program with a sequence of low-level operations which must be carried out in order to conduct the high-level operation via a low-level communication protocol over a low-power bus. A high-level operation includes a text declaration instructing communications to be carried out with a peripheral device. The text declaration includes a human-readable description that cannot be executed by software and/or hardware configured to communicate with a peripheral device via a low-level communication protocol over a low-power bus. In various examples, a configuration file may be structured in accordance with the JavaScript Object Notation (JSON) format.

A software program declares the high-level operation (e.g., "Get_Temperature") in its program code. However, as described above, the high-level operation is not formatted to include lower-level code which can be executed to implement a sequence of operations with a peripheral device. Rather, the system described herein includes a module that is called upon to identify, access, and/or read a configuration file when execution of the software program encounters the high-level operation. Consequently, a developer of the software program can write the software program without having to specifically write or include any lower-level code that specifies a low-level communication protocol. In other words, a developer and/or a software program can interact with a peripheral device without any knowledge of the device specific code which is required to implement the sequence of operations enabling interaction with the peripheral device.

Described herein is a system that is configured to determine that a software program being executed includes a high-level operation (e.g., a text declaration) instructing communications to be carried out with a peripheral device (e.g., a sensor). For instance, a component executing the software program can be configured to recognize a high-level operation, and based on this recognition, the component can call for, identify, and/or access a configuration file associated with the text declaration. Stated alternatively, the component can be configured to map the high-level operation to a specific configuration file. As described above, the configuration file includes the lower-level code configured to perform a sequence of operations enabling the communications with the peripheral device via a low-level communication protocol, such as the $I^2C$ protocol. Consequently, the configuration file is a file that is external to the software program.

The system then causes the lower-level code included in the configuration file to be executed in order perform the sequence of operations enabling the communications with the peripheral device via the low-level communication protocol. For example, a data value may be read from a particular register of the peripheral device or a data value may be written to a particular register of the peripheral device. In another example, a configuration can be applied to the peripheral device by updating a configuration setting. Once the sequence of operations is executed at the lower level in order to satisfy the high-level operation declared in the software program, the system is configured to return information, to the software program, indicating that the communications with the peripheral device via the low-level communication protocol have been conducted. For instance, in a read scenario, this return operation can provide a data value retrieved from a register of a sensor to the software program. Or, in a write scenario, this return operation can provide confirmation that a data value was written to a register of a sensor.

The system that executes the software program can be an Internet of Things (IoT) device which is in some way connected to the peripheral device via a low-power bus.

Alternatively, the system that executes the software program can be a server (e.g., configured as part of a network provider) that is in communication, over a network (e.g., the Internet), with an IoT device connected to the peripheral device via a low-power bus.

In various examples, the high-level operation may include parameters that can be used to perform the sequence of operations specified in the configuration file. For instance, the high-level operation can designate a data value to be passed to the configuration file (e.g., a temperature value that is used to calibrate a pH sensor). Moreover, parameters included in the high-level operation can relate to weight states for the peripheral device, communications timing for the peripheral device, and so forth.

In further examples, the system described herein can store and provide access to a definitions document that defines high-level operations (e.g., text declarations) that developers can use as they write software programs so they do not have to write the lower-level code required to communicate with a peripheral device within the software program. Consequently, the definitions document exposes the high-level operations so that the efficiencies enabled by the configuration files are known to a variety of different developers. The configuration files and/or the definitions document may be generated by a hardware-manufacturer so that any number of software programs can more efficiently be written to interact with a peripheral device. In one example, the generation of the configuration files and the definitions document can occur in association with the market release of a new sensor. Alternatively, the configuration files and/or the definitions document may be generated by a network provider so that any number of software programs executing in the cloud can more efficiently be written to interact with a remotely located peripheral device (e.g., retrieve a data value from a sensor). Consequently, the consumption of time and resources associated with developing software applications can be reduced via the use of a configuration file described herein.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical elements.

FIG. 3 illustrates an example configuration file that can be used to implement a sequence of operations via a low-level communication protocol based on a high-level operation declared in a software program.

DETAILED DESCRIPTION

The techniques described herein enable a software program to communicate with a peripheral device (e.g., a sensor), via a low-level communication protocol such as the Inter-Integrated Circuit (i.e., $I^2C$ or I2C) protocol, even though the software program does not include lower-level code configured to implement a sequence of operations defined for the low-level communication protocol. The techniques determine that the software program includes a high-level operation that instructs for communications to be conducted with the peripheral device. The high-level operation is associated with a separately stored configuration file that includes the lower-level code configured to implement the sequence of operations enabling the communications to be conducted with the peripheral device via the low-level communication protocol. The techniques then execute the lower-level code included in the configuration file and return information, to the software program, indicating that the communications with the peripheral device have been conducted via the low-level communication protocol.

Various examples, scenarios, and aspects are described below with reference to FIGS. 1-7.

Figure 1:
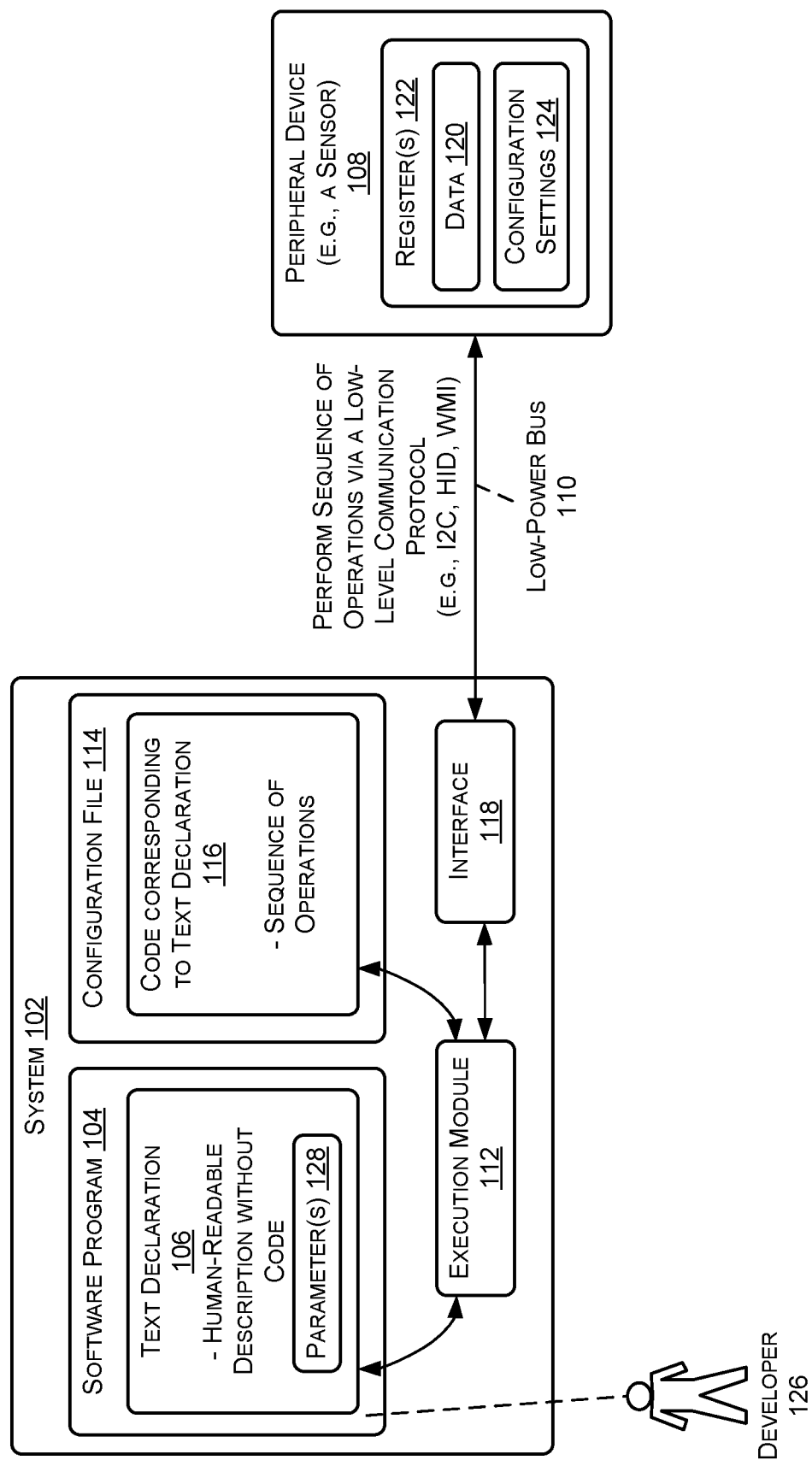
FIG. 1 is a diagram that illustrates components of an example system configured to implement a sequence of operations via a low-level communication protocol based on a high-level operation declared in a software program.

FIG. 1 is a diagram 100 that illustrates components of an example system 102 configured to implement a sequence of operations via a low-level communication protocol based on a high-level operation declared in a software program 104. The software program 104 includes a text declaration 106 instructing communications to be conducted with a peripheral device 108. The peripheral device 108 can include any one of a variety of low-power devices (e.g., a temperature sensor, a pH sensor, an accelerometer, an analog-to-digital converter, etc.).

The text declaration 106 includes a human-readable description that cannot be executed by software and/or hardware configured to communicate with the peripheral device 108 via a low-level communication over a low-power bus 110. That is, the text declaration 106 is not formatted to include lower-level code which can be executed to implement a sequence of operations with the peripheral device 108.

Accordingly, an execution module 112 of the system 102 is configured to determine that the software program 104 being executed includes the text declaration 106 instructing communications to be conducted with the peripheral device 108. Based on this determination, the execution module 112 can call for, identify, and/or access a configuration file 114 associated with the text declaration 106. Stated alternatively, the execution module 112 can be configured to map the text declaration 106 to a specific configuration file 114.

The configuration file 114 includes code 116 that corresponds to the text declaration 106. More specifically, the code 116 included in the configuration file 114 is configured to perform a sequence of operations enabling communications with the peripheral device 108 via a low-level communication protocol, such as the I²C protocol, the Human Interface Device (i.e., HID) protocol, or the WINDOWS Management Interface (i.e., WMI) protocol. As shown, the configuration file 114 is a file that is external to the software program 104. In various examples, a configuration file may be structured in accordance with the JavaScript Object Notation (JSON) format.

The execution module 112 causes the code 116 included in the configuration file 114 to be executed in order perform the sequence of operations enabling the communications with the peripheral device 108 via the low-level communication protocol. The communications are implemented over a low-power bus 110 that connects the peripheral device 108 to a hardware interface 118 configured to implement the low-level communication protocol.

In one example, the sequence of operations read data 120 from a register 122 of the peripheral device 108. In another example, the sequence of operations write data 120 to a register 122 of the peripheral device 108. In yet another example, the sequence of operations apply a configuration to the peripheral device 108 by updating a configuration setting 124. It is understood in the context of this invention that a variety of other operations can be implemented with respect to a peripheral device using a low-level communication protocol.

Once the sequence of operations is executed in order to satisfy the text declaration 106 in the software program 104, the execution module 112 is configured to return information, to the software program 104, indicating that the communications with the peripheral device 108 via the low-level communication protocol have been conducted. For instance, in a read scenario, this return operation can provide the data 120 retrieved from a register 122 of the peripheral device to the software program 104. Or, in a write scenario, this return operation can provide confirmation that the data 120 was written to a register 122 of the peripheral device 108.

As a result of the techniques described herein, a developer 126 can write the software program 104 without having to specifically write or include any lower-level code 116 that specifies a low-level communication protocol. Rather, the developer 126 can include the text declaration 106 which causes the configuration file 114 and the code 116 included therein to be accessed and executed. Thus, the developer 126 and/or the software program 104 can interact with the peripheral device 108 without any knowledge of the device specific code which is required to implement the sequence of operations enabling the interaction with the peripheral device 108.

In various examples, the text declaration 106 may include a parameter 128 that can be used to perform the sequence of operations specified by the code 116 in the configuration file 114. For instance, the text declaration 106 can designate a data value as the parameter 128 to be passed to the configuration file 114 (e.g., a temperature value that is used in a calibration operation of a pH sensor). Moreover, the parameter 128 can relate to a weight state for the peripheral device 108, a communication timing for the peripheral device 108, and so forth.

In one implementation, the system 102 that executes the software program can be a single device, such as Internet of Things (IoT) device, which is connected to the peripheral device 108 via the low-power bus 110 and the hardware interface 118. In this implementation, the software program 104 and the code 116 of the configuration file 114 may be executed by the same device (e.g., an IoT device).

Alternatively, the system 102 described herein can encompass multiple devices. For example, the software program 104 can be executing via a server (e.g., configured as part of a network provider) that is in communication, over a network (e.g., the Internet), with an IoT device connected to the peripheral device 108 via a low-power bus.

Figure 2:
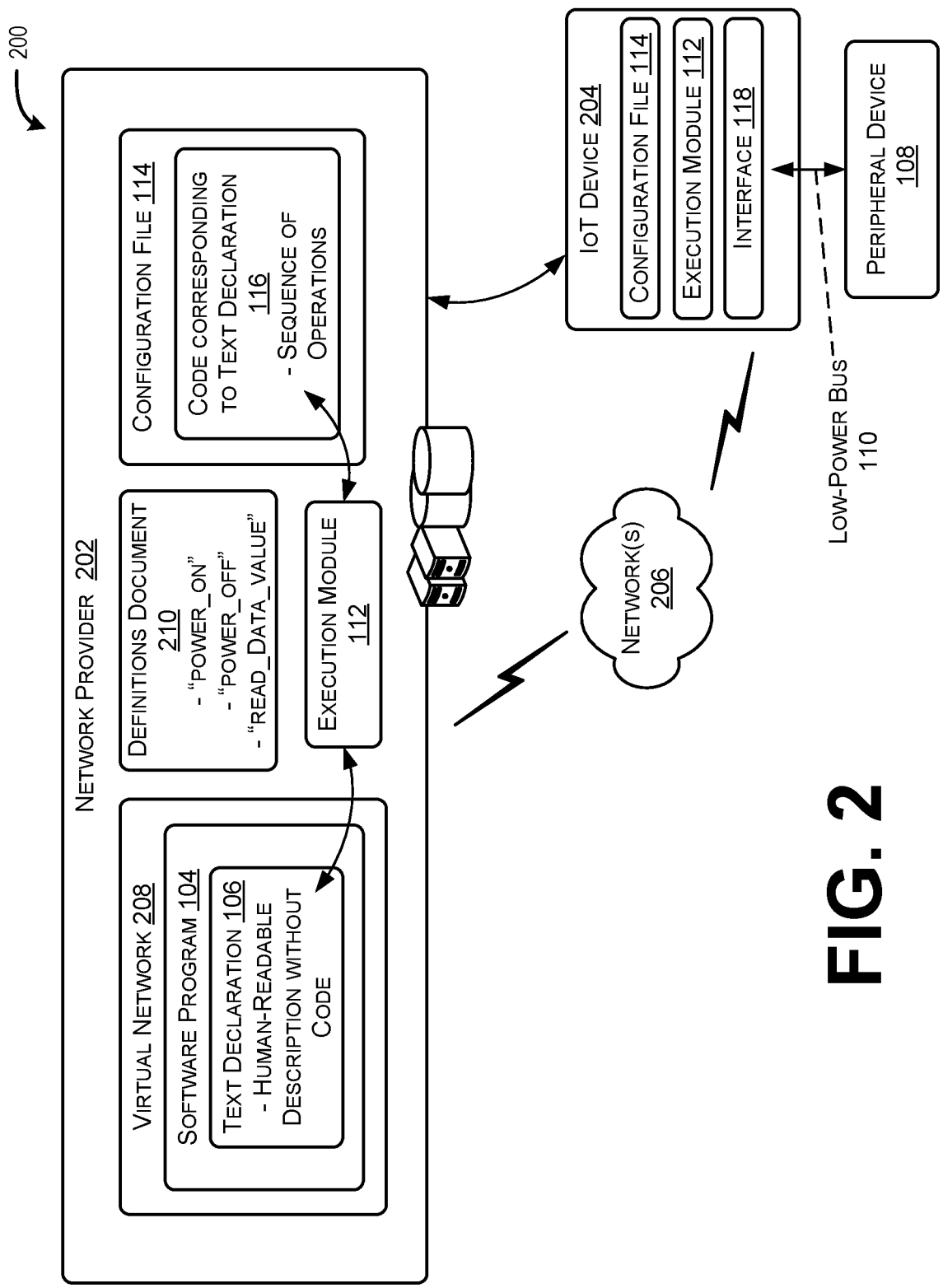
FIG. 2 is a diagram that illustrates components of an example system that uses network communications to implement a sequence of operations via a low-level communication protocol based on a high-level operation declared in a software program.

FIG. 2 is a diagram 200 that illustrates components of an example system that uses network communications to implement a sequence of operations via a low-level communication protocol based on a high-level operation declared in a software program. The diagram 200 includes a network provider 202 and an IoT device 204.

As shown, the network provider 202 is in communication with the IoT device over network(s) 206 (e.g., the Internet, a cellular network, etc.). The software program 104 that includes the text declaration 106 is executing via resources (e.g., a server) of the network provider 202. For example, the network provider 202 can include a cloud-based platform (e.g., AMAZON WEB SERVICES, MICROSOFT AZURE, etc.) that enable tenants (e.g., customers) to consume resources and/or execute workloads, such as the software program, via a virtual network 208 and/or virtual machines.

Accordingly, the network provider 202 can include an instance of the execution module 112 described above. That is, the execution module 112 of the network provider 102 can determine that the software program 104 includes the text declaration 106 instructing communications to be conducted with a remotely located peripheral device 108. Based on this determination, the execution module 112 can call for, identify, and/or access a configuration file 114 associated with the text declaration 106. The configuration file 114 may be located on a server or a storage device that is part of the network provider 202. Alternatively, the configuration file 114 may be located on the IoT device 204 in communication with the network provider 202 over network(s) 206.

Ultimately, an instance of the execution module 112 on the IoT device 204 executes the code 116 in the configuration file 114 in order perform the sequence of operations enabling the communications with the peripheral device 108 via the low-level communication protocol. As described above, after the sequence of operations is executed in order to satisfy the text declaration 106 in the software program 104, the execution modules 112 are configured to return information, to the software program 104, indicating that the communications with the peripheral device 108 via the low-level communication protocol have been conducted.

In various examples, the network provider 202 can store and provide access to a definitions document 210 that defines text declarations that developers can use as they write software programs so they do not have to write the lower-level code required to communicate with a peripheral device 108 within the software program. As an example, the definitions document 210 can include high-level operations for the peripheral device 108, such as "Power_On", "Power_Off", and "Read_Data_Value".

Consequently, the definitions document 210 exposes the high-level operations so that the efficiencies enabled by one or more configuration files 114 are known to a variety of different developers. The configuration files 114 and/or the definitions document 210 may be generated by a hardware-manufacturer of the peripheral device 108 so that any number of software programs can more efficiently be written to interact with the peripheral device 108. Alternatively, the configuration files 114 and/or the definitions document 210 may be generated by the network provider 202 so that any number of software programs executing in the cloud can more efficiently be written to interact with the peripheral device 108 (e.g., retrieve a data value from a sensor).

FIG. 3 illustrates an example configuration file 300 that can be used to implement a sequence of operations via a low-level communication protocol based on a high-level operation declared in a software program.

In this example, the configuration file 300 is used in association with a pH sensor. As illustrated, the structure of the configuration file 300 includes: a name of the high-level operation (e.g., "read_pH"), a parameter that enables the corresponding low-level code to be implemented (e.g., a "temperature" value), an indication that the sequence of operations returns (e.g., a "pH" value), and the actual code useable to implement sequence of operations via the low-level communication protocol (e.g., $I^2C$ in this example). The name of the high-level operation comprises the text declaration 106 used by a developer in a software program 104 so that the system 102 can access the configuration file 300.

As shown, a basic high-level operation that reads a data value from a sensor includes a sequence of low-level operations that need to be performed via a low-level communication protocol. For instance, the first low-level operation shown includes code that writes the "temperature" value to the pH sensor for calibration purposes. The second low-level operation shown includes code that sets a status register to zero. The third low-level operation includes code that polls, or waits for, the status register to become non-zero (e.g., checking every millisecond) before performing the fourth low-level operation includes code that reads the "pH" value from the data register.

Using the techniques described herein, a developer of a software program that wants to retrieve a pH value from a pH sensor can write the software program without having to expend time and resources to specifically write or include any of the lower-level code shown in the example configuration file 300 of FIG. 3.

Figure 4:
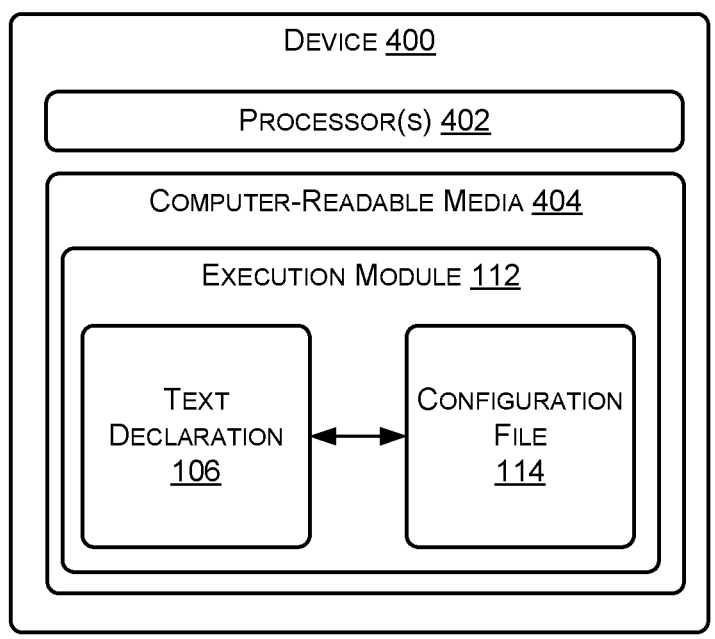
FIG. 4 is a diagram that illustrates components of an example device that can implement the techniques described herein.

FIG. 4 is a diagram of an example device 400 that can implement the techniques described herein. In some implementations, the device 400 corresponds to the system 102 in FIG. 1. In some implementations, the device 400 may be a server that is part of the network provider 202 in FIG. 2.

The device 400 can comprise an Internet of Things (IoT) device, such as a smart meter, a security system, a traffic monitor, a weather condition monitor traffic, a smart air conditioning unit, a smart thermostat, smart lighting system, and so forth. The device 400 can also or alternatively include a desktop computer, a laptop computer, a server, a mobile phone, a head-mounted display device, a game console, a gaming device, a tablet computer, a personal data assistant (PDA), a telecommunication device, a network-enabled television, a terminal, a work station, a media player, or any other sort of computing device.

The device 400 includes processor(s) 402 and computer-readable media 404. As used herein, a "processor" can represent, for example, a CPU-type processing unit, a GPU-type processing unit including a virtual GPU (VGPU), a field-programmable gate array (FPGA), a digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, "computer-readable media" can store instructions executable by a processor and/or data. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of memory included in a device and/or a hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

The device 400 further includes an execution module 112 that is configured to implement the techniques described herein by associating a text declaration 106 with a configuration file 114. The module provided in FIG. 4 is an example, and the number of modules used to implement the techniques described herein can be higher. That is, functionality described herein in association with the illustrated module can be performed by a larger number of modules on one device or spread across multiple devices.

Figure 5:
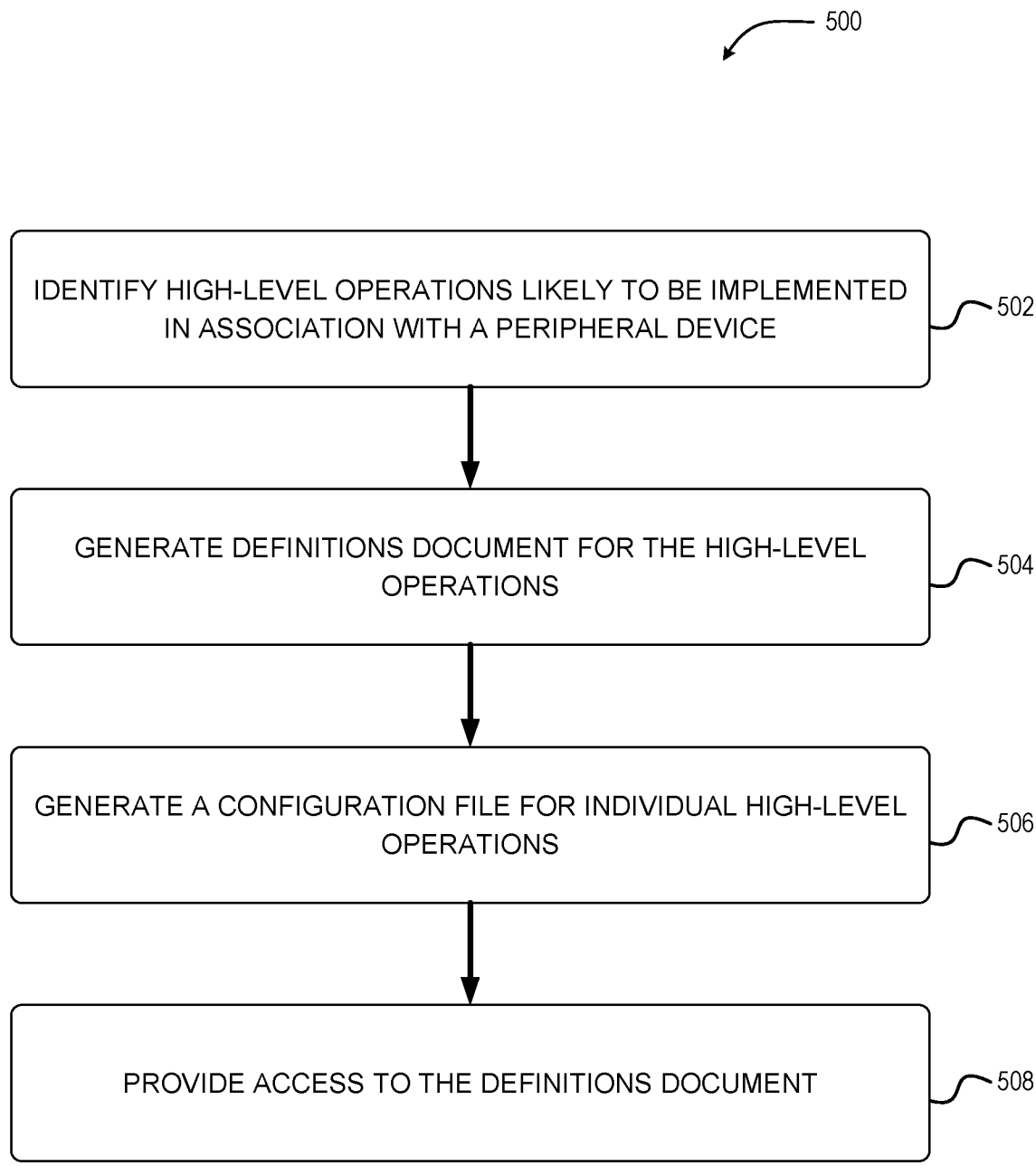
FIG. 5 is a diagram of an example flowchart that illustrates operations directed to generating information that can be used by a developer and/or software program to implement the techniques described herein.
Figure 6:
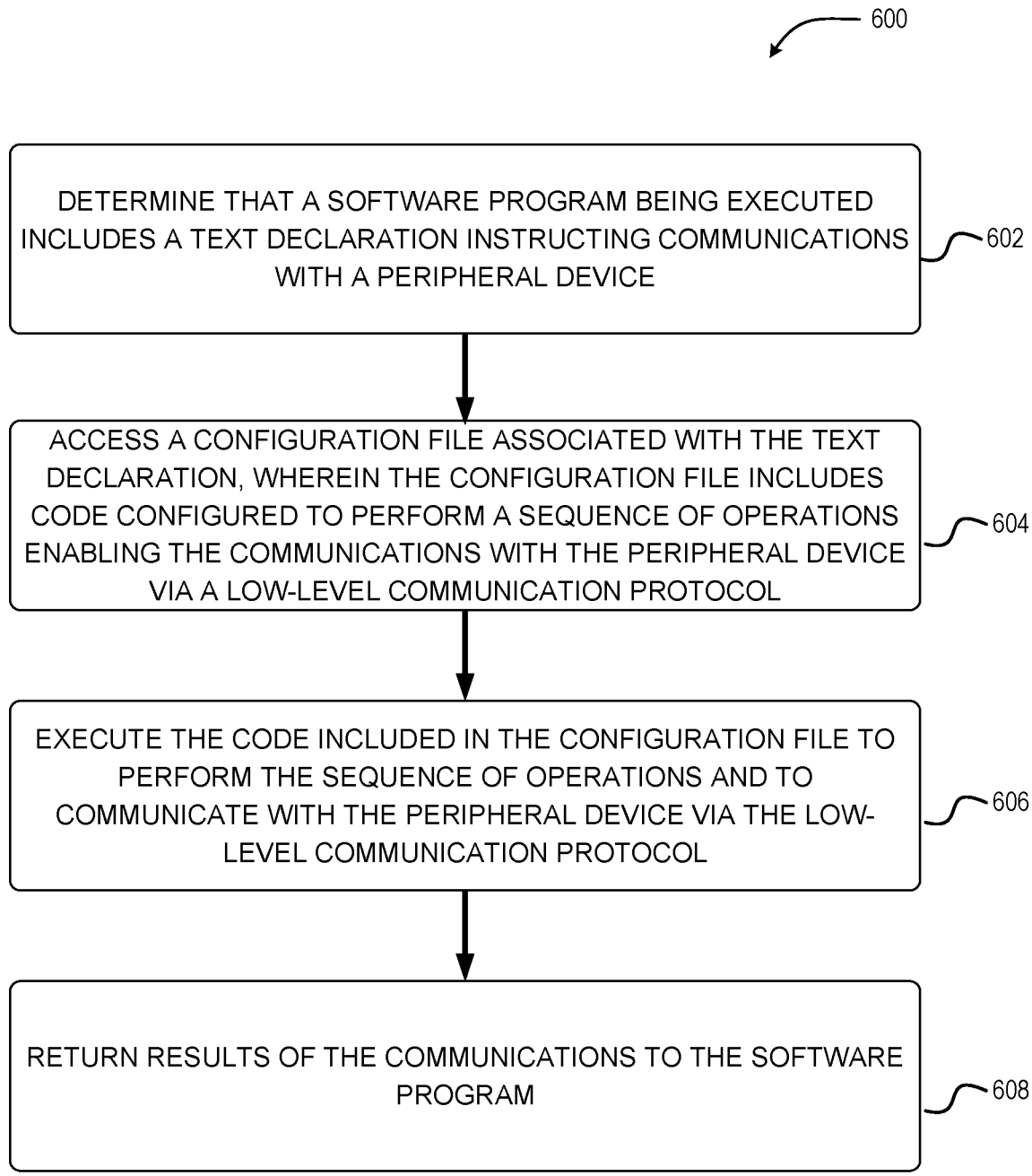
FIG. 6 is a diagram of an example flowchart that illustrates operations directed to associating a text declaration in a software program with a configuration file that includes lower-level code that enables communication with a peripheral device via a low-level communication protocol.

FIGS. 5 and 6 each contain a flowchart of a method. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, wearable computing devices, IoT devices, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

FIG. 5 is a diagram of an example flowchart 500 that illustrates operations directed to generating information that can be used by a developer and/or software program to implement the techniques described herein. In various examples, the operations in FIG. 5 may be performed by a manufacturer of the peripheral device or a network provider configured to communicate with an IoT device connected to the peripheral device.

At operation 502, high-level operations that are likely to be implemented in association with a peripheral device, such as a sensor, are identified. For instance, some of these high-level operations may include powering on the peripheral device, powering off the peripheral device, writing data to the peripheral device, reading data from the peripheral device, and so forth.

At operation 504, a definitions document for the high-level operations is generated. The definitions document may provide a name, or a text declaration, for each high-level operation. For instance, the text declarations may comprise "Power_On", "Power_Off", "Read_Data_Value", and "Write Data Value".

At operation 506, a configuration file is generated for individual high-level operations. In some examples, a configuration file may be generated for a single high-level operations. In other examples, a configuration file may be generated for multiple high-level operations.

At operation 508, access to the definitions document is provided. For example, the definitions document can be exposed to developers that may be writing, or interesting in writing, software programs configured to interact with the peripheral device.

FIG. 6 is a diagram of an example flowchart 600 that illustrates operations directed to associating a text declaration in a software program with a configuration file that includes lower-level code that enables communication with a peripheral device via a low-level communication protocol. In various examples, the operations in FIG. 6 may be performed by IoT device connected to a peripheral device and/or a network provider configured to communicate with the IoT device.

At operation 602, it is determined that a software program being executed includes a text declaration instructing communications with a peripheral device. For example, the communications can be implemented to read a data value from a register of the peripheral device. In another example, the communications can be implemented to write a data value to a register of the peripheral device. In yet another example, the communications can be implemented to apply a configuration to the peripheral device (e.g., power on, power off, etc.).

At operation 604, a configuration file associated with the text declaration is accessed. As described above, the configuration file includes code configured to perform a sequence of operations enabling the communications with the peripheral device via a low-level communication protocol.

At operation 606, the code included in the configuration file is executed. Thus, the sequence of operations is performed and communications with the peripheral device via the low-level communication protocol are implemented.

At operation 608, results of the communications are returned to the software program. For instance, in a read scenario, this return operation can provide a data value retrieved from a register of the peripheral device to the software program. Or, in a write scenario, this return operation can provide confirmation that a data value was written to a register of the peripheral device.

Figure 7:
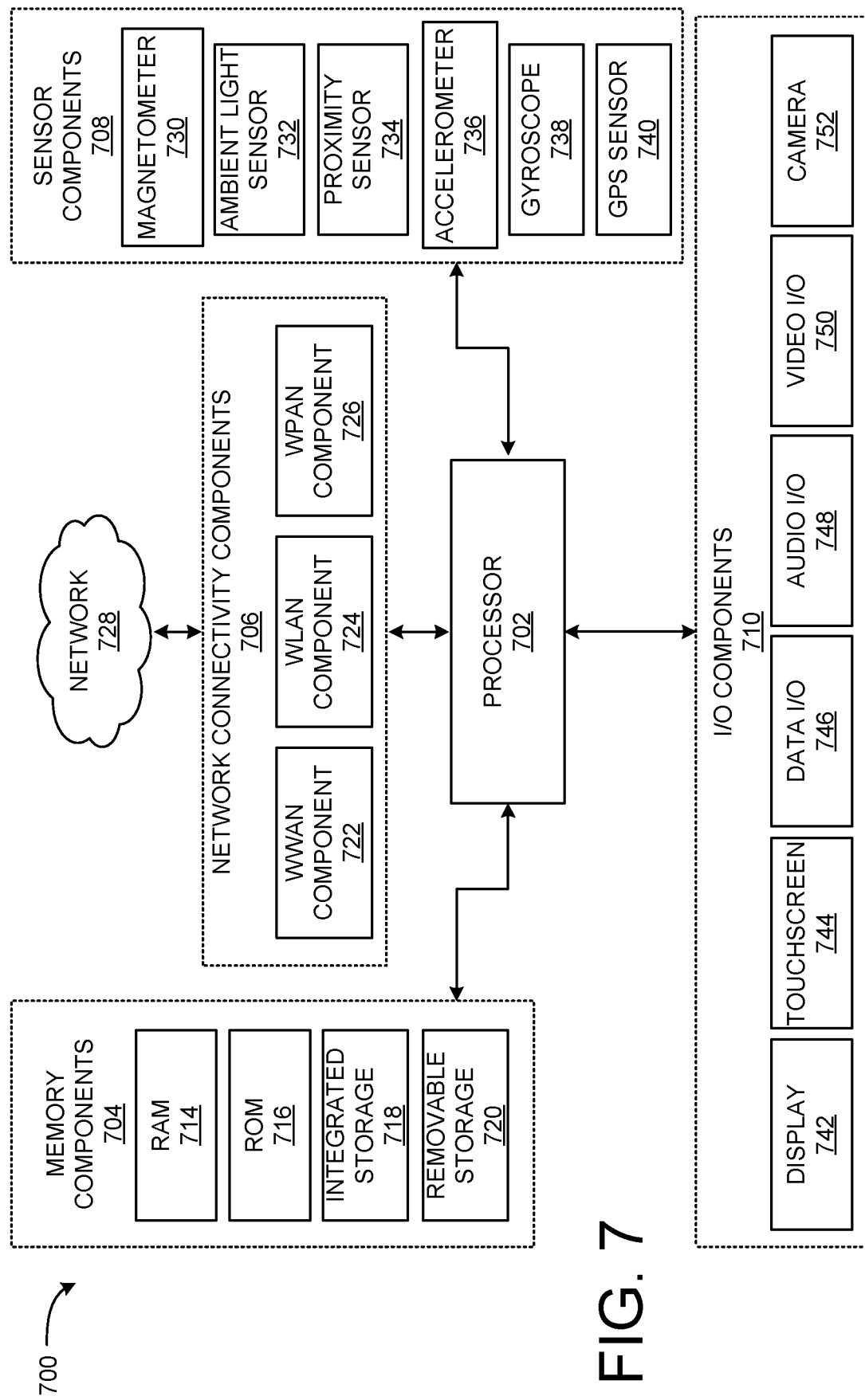
FIG. 7 is a computer architecture diagram illustrating a computing device architecture for a computing device that is capable of implementing aspects of the technologies presented herein.

Turning now to FIG. 7, an example computing device architecture 700 will be described for a system, such as the system 102 in FIG. 1 or the device 400 in FIG. 4, that is capable of executing the various software components described herein.

The computing device architecture 700 illustrated in FIG. 7 includes a processor 702, memory components 704, network connectivity components 706, sensor components 708 (e.g., peripheral devices), and input/output components 710. In the illustrated configuration, the processor 702 is in communication with the memory components 704, the network connectivity components 706, the sensor components 708, and the input/output ("I/O") components 710. The components can be connected electrically in order to interact and carry out device functions. In some configurations, the components are arranged so as to communicate via one or more busses.

The processor 702 includes one or more CPU cores configured to process data, execute computer executable instructions of one or more application programs and to communicate with other components of the computing device architecture 700 in order to perform various functionality described herein. The processor 702 can be utilized to execute aspects of the software components presented herein.

In some configurations, the processor 702 is, or is included in, a system-on-chip ("SoC") along with one or more of the other components described herein below. For example, the SoC can include the processor 702, one or more of the network connectivity components 706, and one or more of the sensor components 708. In some configurations, the processor 702 is fabricated, in part, utilizing a package-on-package ("PoP") integrated circuit packaging technique. Moreover, the processor 702 can be a single core or multi-core processor.

The memory components 704 include a RAM 714, a ROM 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 or the removable storage 720.

The integrated storage 718 can include a solid-state memory, a hard disk, or a combination of solid-state memory and a hard disk. The integrated storage 718 can be soldered or otherwise connected to a logic board upon which the processor 702 and other components described herein might also be connected. As such, the integrated storage 718 is integrated in the computing device. The integrated storage 718 can be configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available and shown to a user as a total combined capacity of the integrated storage 718 and the removable storage 720.

The removable storage 720 is configured to be inserted into a removable storage memory slot or other mechanism by which the removable storage 720 is inserted and secured to facilitate a connection over which the removable storage 720 can communicate with other components of the computing device, such as the processor 702. The removable storage 720 can be embodied in various memory card formats including, but not limited to, PC card, COMPACT-FLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system includes, but is not limited to, the WINDOWS operating system from MICROSOFT CORPORATION, the IOS operating system from APPLE INC. of Cupertino, Calif., and ANDROID operating system from GOOGLE INC. of Mountain View, Calif. Other operating systems can also be utilized.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from a network 728, which can be a WWAN, a WLAN, or a WPAN. Although a single network 728 is illustrated, the network connectivity components 706 can facilitate simultaneous communication with multiple networks. For example, the network connectivity components 706 can facilitate simultaneous communications with multiple networks via one or more of a WWAN, a WLAN, or a WPAN.

The network 728 can be a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 728 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 728 can be configured to provide voice and/or data communications with any combination of the above technologies. The network 728 can be configured or adapted to provide voice and/or data communications in accordance with future generation technologies.

In some configurations, the WWAN component 722 is configured to provide dual-multi-mode connectivity to the network 728. For example, the WWAN component 722 can be configured to provide connectivity to the network 728, wherein the network 728 provides service via GSM and UMTS technologies, or via some other combination of technologies. Alternatively, multiple WWAN components 722 can be utilized to perform such functionality, and/or provide additional functionality to support other non-compatible technologies (i.e., incapable of being supported by a single WWAN component). The WWAN component 722 can facilitate similar connectivity to multiple networks (e.g., a UMTS network and an LTE network).

The network 728 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 728 via the WI-FI access points. Such connections can be secured via various encryption technologies including, but not limited, WI-FI Protected Access ("WPA"), WPA2, Wired Equivalent Privacy ("WEP"), and the like.

The network 728 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 730, an ambient light sensor 732, a proximity sensor 734, an accelerometer 736, a gyroscope 738, and a Global Positioning System sensor ("GPS sensor") 740. It is contemplated that other sensors, such as, but not limited to, temperature sensors or shock detection sensors, might also be incorporated in the computing device architecture 700.

The I/O components 710 include a display 742, a touchscreen 744, a data I/O interface component ("data I/O") 746, an audio I/O interface component ("audio I/O") 748, a video I/O interface component ("video I/O") 750, and a camera 752. In some configurations, the display 742 and the touchscreen 744 are combined. In some configurations two or more of the data I/O component 746, the audio I/O component 748, and the video I/O component 750 are combined. The I/O components 710 can include discrete processors configured to support the various interfaces described below or might include processing functionality built-in to the processor 702.

The disclosure presented herein encompasses the subject matter set forth in the following clauses.

Example Clause A, a system comprising: at least one processor; and memory storing instructions that, when executed by the at least one processor, causes the system to: determine that a software program being executed includes a text declaration that instructs data to be exchanged with a peripheral device; access a configuration file associated with the text declaration, wherein the configuration file includes code configured to perform a sequence of operations enabling the data to be exchanged with the peripheral device via a low-level communication protocol; execute the code included in the configuration file to perform the sequence of operations enabling the data to be exchanged with the peripheral device via the low-level communication protocol; and return information to the software program indicating that the data has been exchanged with the peripheral device via the low-level communication protocol.

Example Clause B, the system of Example Clause A, wherein the text declaration comprises a human-readable description.

Example Clause C, the system of Example Clause A or Example Clause B, wherein the text declaration comprises a high-level operation and the sequence of operations are low-level operations implemented over a low-power bus connecting the peripheral device to the system.

Example Clause D, the system of any one of Example Clauses A through C, wherein the software program is executing on a server in communication with the system.

Example Clause E, the system of any one of Example Clauses A through D, wherein: exchanging the data with the peripheral device comprises reading the data from a register of the peripheral device; and returning the information to the software program indicating that the data has been exchanged with the peripheral device via the low-level communication protocol comprises providing the data read from the register of the peripheral device to the software program.

Example Clause F, the system of Example Clause E, wherein the peripheral device comprises a sensor configured to sense the data and store the data in the register.

Example Clause G, the system of any one of Example Clauses A through D, wherein: exchanging the data with the peripheral device comprises writing the data to a register of the peripheral device; and returning the information to the software program indicating that the data has been exchanged with the peripheral device via the low-level communication protocol comprises providing confirmation that the data has been written to the register of the peripheral device.

Example Clause H, the system of any one of Example Clauses A through G, wherein the configuration file is external to the software program and the instructions further cause the system to expose a definitions document that defines the text declaration such that a developer of the software program is not required to write the code within the software program.

Example Clause I, the system of any one of Example Clauses A through H, wherein the low-level communication protocol comprises one of: an inter-integrated circuit (I2C) protocol, a human interface device (HID) protocol, or a WINDOWS management interface (WMI) protocol.

Example Clause J, the system of any one of Example Clauses A through I, wherein the text declaration comprises a parameter useable to perform the sequence of operations.

Example Clause K, a system comprising: at least one processor; and memory storing instructions that, when executed by the at least one processor, causes the system to: determine that a software program being executed includes a text declaration that instructs a specific configuration to be applied to a peripheral device; access a configuration file associated with the text declaration, wherein the configuration file includes code configured to perform a sequence of operations enabling the specific configuration to be applied to the peripheral device via a low-level communication protocol; execute the code included in the configuration file to perform the sequence of operations enabling the specific configuration to be applied to the peripheral device via the low-level communication protocol; and return information to the software program indicating that the specific configuration has been applied to the peripheral device via the low-level communication protocol.

Example Clause L, the system of Example Clause K, wherein the text declaration comprises a human-readable description.

Example Clause M, the system of Example Clause K or Example Clause L, wherein the text declaration comprises a high-level operation and the sequence of operations are low-level operations implemented over a low-power bus connecting the peripheral device to the system.

Example Clause N, the system of any one of Example Clauses K through M, wherein the software program is executing on a server in communication with the system.

Example Clause O, the system of any one of Example Clauses K through N, wherein the peripheral device comprises a sensor configured to sense a particular type of data.

Example Clause P, the system of any one of Example Clauses K through O, wherein the configuration file is external to the software program and the instructions further cause the system to expose a definitions document that defines the text declaration such that a developer of the software program is not required to write the code within the software program.

Example Clause Q, the system of any one of Example Clauses K through P, wherein the low-level communication protocol comprises one of: an inter-integrated circuit (I2C) protocol, a human interface device (HID) protocol, or a WINDOWS management interface (WMI) protocol.

Example Clause R, the system of any one of Example Clauses K through Q, wherein the text declaration comprises a parameter useable to perform the sequence of operations.

Example Clause S, a method comprising: identifying a configuration file associated with a text declaration included in a software program, wherein the configuration file includes code configured to perform a sequence of operations enabling data to be exchanged with a peripheral device via a low-level communication protocol; causing the code included in the configuration file to be executed and the sequence of operations enabling the data to be exchanged with the peripheral device to be performed via the low-level communication protocol; and returning information to the software program indicating that the data has been exchanged with the peripheral device via the low-level communication protocol.

Example Clause T, the method of Example Clause S, wherein the text declaration comprises a human-readable description and the sequence of operations are implemented over a low-power bus connecting the peripheral device to a processor configured to return the information to the software program.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   at least one processor; and
   memory storing instructions that, when executed by the at least one processor, causes the system to:
   determine that a software program being executed includes a text declaration that instructs data to be exchanged with a peripheral device, wherein the text declaration comprises a human-readable description;
   map the text declaration to a configuration file that includes code configured to perform a sequence of operations enabling the data to be exchanged with the peripheral device via a low-level communication protocol;
   execute the code included in the configuration file to perform the sequence of operations enabling the data to be exchanged with the peripheral device via the low-level communication protocol; and
   return information to the software program indicating that the data has been exchanged with the peripheral device via the low-level communication protocol.

2. The system of claim 1, wherein the text declaration comprises a high-level operation and the sequence of operations are low-level operations implemented over a low-power bus connecting the peripheral device to the system.

3. The system of claim 1, wherein the software program is executing on a server in communication with the system.

4. The system of claim 1, wherein:
   exchanging the data with the peripheral device comprises reading the data from a register of the peripheral device; and
   returning the information to the software program indicating that the data has been exchanged with the peripheral device via the low-level communication protocol comprises providing the data read from the register of the peripheral device to the software program.

5. The system of claim 4, wherein the peripheral device comprises a sensor configured to sense the data and store the data in the register.

6. The system of claim 1, wherein:
   exchanging the data with the peripheral device comprises writing the data to a register of the peripheral device; and
   returning the information to the software program indicating that the data has been exchanged with the peripheral device via the low-level communication protocol comprises providing confirmation that the data has been written to the register of the peripheral device.

7. The system of claim 1, wherein the configuration file is external to the software program and the instructions further cause the system to expose a definitions document that defines the text declaration such that a developer of the software program is not required to write the code within the software program.

8. The system of claim 1, wherein the low-level communication protocol comprises one of: an inter-integrated circuit (I2C) protocol, a human interface device (HID) protocol, or a WINDOWS management interface (WMI) protocol.

9. The system of claim 1, wherein the text declaration comprises a parameter that is written to the peripheral device to perform the sequence of operations.

10. A system comprising:
    at least one processor; and
    memory storing instructions that, when executed by the at least one processor, causes the system to:
    determine that a software program being executed includes a text declaration that instructs a specific configuration to be applied to a peripheral device, wherein the text declaration comprises a human-readable description;
    map the text declaration to a configuration file that includes code configured to perform a sequence of operations enabling the specific configuration to be applied to the peripheral device via a low-level communication protocol;

execute the code included in the configuration file to perform the sequence of operations enabling the specific configuration to be applied to the peripheral device via the low-level communication protocol; and return information to the software program indicating that the specific configuration has been applied to the peripheral device via the low-level communication protocol.

11. The system of claim 10, wherein the text declaration comprises a high-level operation and the sequence of operations are low-level operations implemented over a low-power bus connecting the peripheral device to the system.

12. The system of claim 10, wherein the software program is executing on a server in communication with the system.

13. The system of claim 10, wherein the peripheral device comprises a sensor configured to sense a particular type of data.

14. The system of claim 10, wherein the configuration file is external to the software program and the instructions further cause the system to expose a definitions document that defines the text declaration such that a developer of the software program is not required to write the code within the software program.

15. The system of claim 10, wherein the low-level communication protocol comprises one of: an inter-integrated circuit (I2C) protocol, a human interface device (HID) protocol, or a WINDOWS management interface (WMI) protocol.

16. The system of claim 10, wherein the text declaration comprises a parameter that is written to the peripheral device to perform the sequence of operations.

17. A method comprising:

receiving, from a software program being executed, a text declaration that comprises a human-readable description;

identifying a configuration file associated with the text declaration, wherein the configuration file includes code configured to perform a sequence of operations enabling data to be exchanged with a peripheral device via a low-level communication protocol;

causing the code included in the configuration file to be executed and the sequence of operations enabling the data to be exchanged with the peripheral device to be performed via the low-level communication protocol; and returning information to the software program indicating that the data has been exchanged with the peripheral device via the low-level communication protocol.

18. The method of claim 17, wherein the sequence of operations are implemented over a low-power bus connecting the peripheral device to a processor configured to return the information to the software program.

* * * * *